United States Patent    [11] 3,616,963

[72] Inventor  Kenneth M. Sinnott
                Ellicott City, Md.
[21] Appl. No. 618,344
[22] Filed     Feb. 24, 1967
[45] Patented  Nov. 2, 1971
[73] Assignee  W. R. Grace & Co.
                Hanover Square, New York, N.Y.
                Continuation-in-part of application Ser. No.
                553,658, May 31, 1966, now abandoned.

[54] POLYAMIDE EPOXY RESIN REACTION PRODUCT ADHESIVE
     4 Claims, No Drawings

[52] U.S. Cl. ................................................. 220/81,
      161/186, 161/227, 161/214, 260/830, 156/309
[51] Int. Cl. ........................................................ B65d 7/34,
                                                              C08g 45/12

[50] Field of Search ........................................... 260/830,
                                                  830 P, 33.4; 161/214; 220/81

[56]                References Cited
                UNITED STATES PATENTS
2,994,456   8/1961   Peerman ........................    220/81
3,150,117   9/1964   Gabler ..........................   260/33.4
3,261,882   7/1966   Gorton ..........................   260/830 P
                FOREIGN PATENTS
  986,190   3/1965   Great Britain ................   260/830 P Primary Examiner—Robert F. Burnett
Assistant Examiner—R. J. Roche
Attorneys—Jane M. Binkowski and Kenneth E. Prince ABSTRACT: This invention is directed to an adhesive consisting essentially of a transparent amorphous polyamide formed from terephthalic acid and an isomeric mixture of 2,2,4- and 2,4,4-trimethylhexamethyenediamines in combination with an epoxy resin and laminates formed with such an adhesive.

POLYAMIDE EPOXY RESIN REACTION PRODUCT ADHESIVE

This application is a continuation-in-part of copending application, Ser. No. 553,658 filed May 31, 1966, now abandoned.

All commercial polyamides and most known polyamides are semicrystalline in significant amounts with the remaining amount being amorphous. The crystallinity imparts opaqueness or translucency to the polymer. An amorphous polyamide is optically clear.

In the past, there have been inherent disadvantages in the use of crystalline polyamides as adhesives. They have poor aging characteristics due to continued crystallization or recrystallization with time. This results in a decrease of the adhesive bond strength with time. An amorphous polyamide, on the other hand, does not undergo crystallization with aging and therefore, retains its original bond strength to a greater degree than a crystalline polyamide. In addition, the crystallization of a semicrystalline polyamide during cooling from the temperature of bond formation produces stress concentrations in the bond which also result in a decrease in bond strength. A stress concentration of this type would not occur in an amorphous polyamide.

Briefly stated, the adhesive of the present invention comprises an amorphous polyamide. This amorphous polyamide is optically clear and has no detectable crystallinity by X-ray.

In one embodiment of the instant invention, the adhesive is comprised of the reaction product of the amorphous polyamide with an epoxy resin.

Representative of the amorphous polyamides satisfactory as adhesives in the present invention are those disclosed in U.S Pat. No. 3,150,117.

These polyamides are of radically different properties from the fiber-forming nylons and may be made by condensing terephthalic acid, isophthalic acid or mixtures thereof with a hexamethylenediamine containing at least three side chain carbon atoms introduced by alkyl substitution of the main hydrocarbon chain. The alkyl substitution may be in the form of one or more alkyl groups, and the total number of side chain atoms may vary from three to as many as 18. Suitable substituted hexamethylenediamines are, for example, 2-methyl-4-ethylhexamethylenediamine; 2-ethyl-4-methylhexamethylenediamine; 2,2,4-trimethylhexamethylenediamine; 2,4,4-trimethylhexamethylenediamine; 2,2,5,5-tetramethylhexamethylenediamine; 3-isopropylhexamethylenediamine; 3-isooctylhexamethylenediamine; 3-isododecylhexamethylenediamine and 2,4-diethylhexamethylenediamine.

The polyamides of this invention contain recurring units having the following structure:

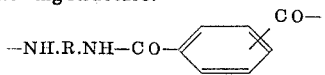

where R is a straight chain of six methylene groups, said chain being substituted by at least one alkyl group, the total number of side chain carbon atoms introduced by the a alkyl substitution being at least three.

Although the polyamides of this invention are closely similar in chemical structure to those of the prior art, they nevertheless possess a number of strikingly different characteristics which set them apart from the prior art polymers. The most striking property of the polyamides of this invention is their transparent, glass clear appearance, which persists even after prolonged periods of heating and slow cooling. It is evident that these new polymers are completely amorphous, and that their amorphous state is thermodynamically stable. The new polymers, furthermore, soften gradually over a wide temperature range, usually about 20° to 40° C., and for this reason are particularly well suited to molding and other shaping procedures. They are not only soluble in typical polyamide solvents such as sulfuric acid, formic acid, phenol and cresol, but also swell extensively in the lower alcohols, for example, methanol, ethanol and isopropanol, to give honeylike pourable masses suitable for coating and adhesive applications. The polyamides of this invention have excellent tensile strength, impact resistance, and flexibility. Unlike conventional polyamides, however, they have a very low capacity for elongation. This property, together with their completely amorphous nature, makes the polyamides of this invention unsuitable for the production of artificial textile fibers.

The alkyl-substituted hexamethylenediamines which are used in this invention may be prepared in various ways. In one method, alkyl-substituted phenols are oxidized by air or nitric acid to dicarboxylic acids, which are reacted with ammonia to form the corresponding dinitriles. The dinitriles are then converted by catalytic hydrogenation to the alkyl-substituted hexamethylenediamines. Thus, starting with 4-isopropylphenol, the end product of the synthesis is 3-isopropylhexamethylenediamine. A problem is encountered when the phenol is unsymmetrically substituted by alkyl groups, however, since a mixture of isomeric dicarboxylic acids results from the oxidation step, and the end product of the synthesis is an isomeric mixture of diamines. For example, 3-methyl-5-ethylphenol yields a mixture of 2-methyl-4-ethylhexamethylenediamine and 2-ethyl-4-methylhexamethylenediamine. The separation of such a mixture into its pure components adds a complicated and very expensive step to the process.

A similar problem is encountered when isophorone, 3,3,5-trimethylcyclohexenone, is used as the raw material for the production of trimethylhexamethylenediamine. In this process, the isophorone is hydrogenated to dihydroisophorone, which is then oxidized to form trimethyladipic acid. The synthesis then proceeds as described above, through the nitrile, to trimethylhexamethylenediamine. In this case, also, the end result is a mixture of steric isomers, 2,2,4- and 2,4,4-trimethylhexamethylenediamine.

It has been discovered, quite unexpectedly, that the polyamides produced from isomeric mixtures of alkyl substituted hexamethylenediamines such as those described above possess characteristics which are practically identical with those produced from the sterically pure hexamethylenediamines. This discovery constitutes an outstanding economic advantage in the manufacture of the polyamides of this invention, since it means that the expensive and difficult step of isomer separation may be omitted from the synthesis of the unsymmetrically substituted diamines.

Terephthalic acid, isophthalic acid or mixture of the two acids may be used to produce the polyamides of this invention. The discovery that mixtures of these acids may be employed to produce useful polyamides is most unexpected, since ordinarily the use of mixtures of acids in the preparation of superpolyamides results in products which have much lower melting points and generally less desirable properties than the corresponding polyamides made from either acid alone.

The polyamides of this invention are clear and transparent and have generally similar properties whether they are made with terephthalic acid, isophthalic acid, or with mixtures of the two. The terephthalamides are generally preferred for most purposes, however, since their melting points are from 50° to 100° C. higher than and their mechanical properties somewhat superior to those of the corresponding isophthalamides. The melting points and mechanical properties of the mixed polymers are intermediate between those of the two types of homopolymers.

Of particular interest are the polyamides of acid mixtures containing only small amounts of isophthalic acid, preferably not more than about 5 or at the most 10 percent. These mixed polyamides melt at temperatures only slightly lower than do the corresponding terephthalamide polymers, and are indistinguishable from the pure terephthalamides with respect to their mechanical properties. For this reason, the polyamides made from low isophthalic acid content mixtures constitute a preferred form of this invention.

It is particularly important from an economic point of view that this preferred group of mixed polymers may be made from the less purified and therefore less expensive grades of terephthalic acid in which a small proportion of isophthalic acid is present as an impurity. Terephthalic acid is often produced from p-xylene, or alternatively it may be made by the isomerization of o-phthalic acid. In both these processes, it is difficult to avoid the presence of a small amount of isophthalic acid. Since a considerable portion of the cost of high purity terephthalic acid is due to the tedious and costly procedures which are necessary in order to remove the m-isomers either from the raw material or from the final product, a terephthalic acid which contains a few percent of isophthalic acid will, of course, be much less expensive than the 100 percent p-isomer. The ability to use the less expensive grades of terephthalic acid in the manufacture of polyamides is an important aspect of this invention.

Preparation of the linear polyamides of the present invention can be accomplished directly from the aromatic dicarboxylic acid and the alkylated diamines. It is more advantageous, however, first to prepare the salt of the components in a molar ratio of 1:1. This can be accomplished by means of the following general procedure:

A suspension of 1 mole of acid in 300 ml. water is heated under reflux and a solution of 1.05 moles of the alkylated diamine in 500 ml. alcohol is slowly added dropwise. Any salt which is still undissolved is brought into solution by the addition of a small quantity of water. The yellowish solution is decolorized with animal charcoal and filtered, yielding the salt in the form of colorless crystals. This is then purified by several recrystallizations from 70 to 80 percent alcohol.

Polycondensation of the salt can be effected by one of the known batch or continuous methods as developed for the preparation of polyhexamethylene adipamide (nylon 6/6). The discontinuous method is best carried out in three steps, for which the following method can generally be used:

One hundred parts by weight of the salt, containing 0.161 percent of an organic mono- or dicarboxylic acid as a stabilizer, is liquefied with the aid of 20 to 50 parts water at 120° to 140° C. in a stainless steel dissolving vessel which is with a heating element and stirring means and connected to a medium pressure autoclave. The liquid is then transferred by nitrogen pressure into the autoclave which has been preheated to 250° C. After the release of the water vapor the temperature is raised while still at atmospheric pressure and under a continuous stream of nitrogen, over a period of 2 to 3 hours, to 280° C. the liquid being held at this temperature for a further 1.5 to 2 hours. Under certain circumstances, it is also advantageous to carry out an evacuation to 2.5 mm. Hg for about half an hour, in order to remove the last traces of water produced in the condensation.

Other amide-forming derivatives of the aromatic dicarboxylic acid, for example its esters with volatile alcohols, may be used in the preparation of the salt, as may the amide-forming derivatives of the diamines, for example the N,N-diformyl derivatives.

Compatible dyestuffs, plasticizers, stabilizers, bleaching agents and other additives may be added to the polycondensation reaction mixture if desired, either before, during or after the reaction. In some cases, it may be preferable to prepare a solid precondensation produce first, to mix it with one or more of the above-mentioned ingredients, and finally to finish the polycondensation reaction without pressure.

The polycondensation reaction may be carried out, if desired, in an inert solvent such as N-alkyl-pyrrolidone, N-alkyl piperidone and similar cyclic amides, or in suspension in a suitable nonsolvent liquid. In such cases, the polycondensation is preferably carried out at the boiling temperature of the solvent (210° to 280° C). To remove the water, the solvent is recycled continuously and is dehydrated over a suitable drying agent. The polycondensation may also be carried out in a melt condensation process, in which case the addition of a small amount of solvent, generally no more than 10 percent, may be useful to lower the melt viscosity and to accelerate the separation of bubbles.

The polyamides of the present invention can also be prepared at lower temperatures using the boundary surface or interfacial condensation method (U.S. Pat. No. 2,831,834) which consists in mixing, with thorough stirring, equivalent or nearly equivalent quantities of an acid halide, dissolved in a water immiscible solvent such as carbon tetrachloride, and an aqueous solution of the diamine. By this method, the polyamides are obtained as a finely granular colorless powder (intrinsic viscosity, 0.6 to 1.0). Obviously other methods will yield polyamides having higher or lower intrinsic viscosities.

It has been found, in general, however, that it is difficult to obtain the particular polyamides of the invention in the desired high molecular weights when using the boundary surface condensation method, and for this reason, it is preferred to use the thermal polycondensation process described above.

As in all polycondensation reactions, a high degree of purity of the reactants is required in the present combination of aromatic dicarboxylic acid with alkylated diamines. It has been found that both the acids and the diamines used should have a purity of at least 99.8 percent by titration in order to obtain sufficient chain length for optimum mechanical strength of the polycondensation products. Monofunctional byproducts such as monoamines, monoimines and monocarboxylic acids are particularly deleterious.

These polyamides are film forming, completely amorphous and glass clear. They are produced by reacting terephthalic acid, isophthalic acid and mixtures thereof with an alkyl-substituted aliphatic hexamethylenediamine in which the alkyl substitution consists of three to 18 carbon atoms. Suitable substituted hexamethylenediamines are, for example, 2-methyl-4-ethylhexamethylenediamine; 2-ethyl-4-methylhexamethylenediamine; 2,2,4-trimethylhexamethylenediamine; 2,4,-trimethylhexamethylenediamine; 2,2,5,5-tetramethylhexamethylenediamine and 3-isopropylhexamethylenediamine. Additional amorphous polyamides are disclosed in U.S. Pat. Nos. 3,198,771; 3,145,193 and 3,150,113. All of these polyamides are film forming.

These amorphous polyamides bond well with a number of materials including metals, They are particularly useful as a substitute for solder in the side seam of sheet metal containers.

The instant polyamide can be used as an adhesive in any conventional manner suitable for hot melt adhesives. For example, in forming laminates, a layer of the polyamide is preferably applied in molten form to a side, i.e. the adhesive surface, of one of the adherends, and the second adherend is superposed on the molten polyamide to form a sandwich. The polyamide also may be used initially in solid form such as a film, The polyamide film is then placed between the adhesive surfaces of the adherends to form a sandwich which is then heated to convert the polyamide to molten form. To assure good contact, pressure may be applied to the sandwich in any conventional manner. For example, the sandwich may be passed through a pair of nip rolls. The polyamide adhesive hardens and develops strength merely by cooling to the solid state.

In one embodiment of the present invention, the instant polyamide is reacted with an epoxy resin to form a thermosetting adhesive. Presumably, there is a reaction between the epoxy and amide groups. The resulting adhesive has good peel strength.

The epoxy resins satisfactory for use in the present invention are liquids or solids having an epoxide equivalent of 140 to 375 and an average molecular weight of 290 to 750. The viscous liquid epoxy resins that have epoxide equivalent weights of 170–300 are particularly useful. The epoxide equivalent is the number of grams of epoxide resin containing 1 gram—equivalent of epoxide. The epoxy resins disclosed in U.S. Pat. Nos. 2,456,408 and 2,592,560 formed by the reaction of a polyhydric alcohol such as glycol, glycerine, polyphenols or polyhydric phenols with an excess of an epoxide such as epihalohydrin or an alkylene oxide are suitable. The epoxy resin which is the condensation product of epichlorohydrin and bisphenol A(4,4'-isopropylidenediphenol) is preferred.

The epoxy resin may be contacted with the polyamide in any suitable manner. The reaction is carried out while the polyamide is in a molten form. For example, the polyamide may initially be in solid form in any desired shape such as film or rod. The epoxy resin preferably is initially in liquid form or in the form of a solution with a volatile solvent. The solid polyamide is contacted with the epoxy resin in any conventional manner such as by immersing the polyamide in the epoxy resin. When the polyamide is coated with an epoxy solution, the coating should be allowed to dry to evaporate the solvent prior to use with a nonporous adherend. The epoxy resin coated polyamide is applied to the surfaces to be bonded, and the reaction is carried out by heating the coated polyamide to a temperature at which the polyamide is molten to effect a cure. The curing temperature, i.e. reaction temperature, can be any temperature at which the polyamide is molten, but it must not be so high as to degrade the polymer. Curing is continued until maximum bond strength is developed. Curing time depends somewhat on the specific reactants and specific curing temperature and is easily determined experimentally. It may be as low as about five seconds, and generally, it does not take longer than two minutes. Since the polyamide-epoxy resin reaction product is thermosetting, the bond cannot be destroyed by remelting.

Alternatively, the epoxy resin may be coated on the adhesive surface of each adherend and a film of the polyamide placed between the coated surfaces to form a sandwich. The sandwich is then heated to effect a cure.

The amount of epoxy resin used to react with the polyamide may vary. It is necessary only to have a very thin coating or film of the epoxy resin contacting the polyamide. Ordinarily, an amount of epoxy resin of about 1 to 15 milligrams per square inch of polyamide is suitable. Amounts in excess of the 15 milligrams of epoxy resin have little significant affect on the bond strength.

All parts and percentages used herein are by weight unless otherwise indicated.

The invention is further illustrated by the following examples.

EXAMPLE 1

A linear, amorphous, transparent polyamide formed from terephthalic acid and an isomeric mixture of 2,2,4- and 2,4,4-trimethylhexamethylenediamine substantially as disclosed in example III of U.S. Pat. No. 3,150,117 was used in this example. Said polyamide was made by the following method. 16.6 parts of terephthalic acid were mixed with 30 ml. water and brought almost to boiling on a steam bath. By means of a dropper funnel, a solution of 16.5 parts of an isomeric mixture of 2.2.4- and 2,4,4-trimethylhexamethylenediamine in 50 ml. alcohol was slowly added dropwise; this finally resulted in the complete solution of the terephthalic acid. After cooling, the polyamide which was produced by the polycondensation reaction was transparent and glass clear, melted over the range of 190°–220° C. and had an intrinsic viscosity of 1.50. The polyamide melted over the range of 190° to 220° C. Film of this polyamide, having a thickness of 0.006–0.010 inch, was used as the adhesive.

In this example, the shear strength of the bond formed by the polyamide with black iron sheet was determined substantially as set forth in ASTM D 1,002–64. In this test one side of one end portion of a sheet of metal is covered with adhesive and an end portion of a second sheet of metal is placed over the adhesive. It is the strength of this overlap laminated area that is tested.

The adherends used were sheets of black iron 3 inches long, 1 inch wide and 0.008–0.010 inch thick. The polyamide film, was placed between the adherends and covered the overlap area. The overlap area measured one-fourth inch.

The assembly was placed in a conventional hydraulic press which had been preheated to 230° C. The press was set so that the final thickness of the polyamide adhesive would be 0.003 inch. The assembly was pressed together at the 230° C. temperature for 2 minutes under a pressure of 10,000 p.s.i. The resulting laminate was then allowed to cool to room temperature.

Three laminates were prepared in the above manner. The crosshead speed, i.e. separation rate of the tester, was 1 inch per minute. The average strength of the adhesive bond in shear of these laminates was 1,833 p.s.i.

EXAMPLE 2

In this example, the peel resistance of the bond of the polyamide film disclosed in example 1 with black iron sheet was determined. The assembly formed for testing was substantially the same as that set forth in ASTM D 1,876–61T, i.e. a sandwich was formed of the two adherends which were bonded together by adhesive over a major portion leaving two coextensive unbonded ends for clamping in the grips of the testing machine.

The black iron sheets used in this example were 5 inches long, 1 inch wide and 0.008–0.010 inch thick. The polyamide film covered an area 3 inches long and 1 inch wide.

The sandwich was laminated as set forth in example 1 except that the temperature of the hydraulic press was 220° C.

Two laminates were prepared in this manner. The peel strength was determined substantially as set forth in ASTM D 1,876–61T with the separation rate of the tester set at 1 inch per minute.

These laminates had an average peel strength of less than 5 pounds per inch of width.

EXAMPLE 3

In this example, the shear strength of the bond formed by the reaction product of the polyamide film disclosed in example 1 and an epoxy resin with black iron sheet was determined. This epoxy resin ("Epon 828") is the reaction product of epichlorohydrin and bisphenol A (4,4'-isopropylidenediphenol). It is a viscous liquid at room temperature and has a viscosity of 100–160 poises at 25°C.

The procedure used in this example was the same as that set forth in example 1 except that a coating of the epoxy resin was first applied to the adhesive area of each adherend and the polyamide film placed therebetween.

The assembly was laminated in substantially the same manner as set forth in example 1, except the temperature of the hydraulic press was 205° C. and pressure of 10,000 p.s.i. was applied at this temperature for 10 minutes to give a final thickness of adhesive of 0.003 inch.

Three laminates were prepared in this manner.

The average strength of the bond in shear of these laminates was 1,977 p.s.i.

EXAMPLE 4

In this example, the peel strength of the bond formed by the reaction product of the polyamide film disclosed in example 1 and the epoxy resin disclosed in example 3 with black iron sheet was determined.

The procedure used in this example was the same as that set forth in example 2 except that a coating of the epoxy resin was applied to the adhesive area of each adherend and the polyamide film placed therebetween.

The sandwich was laminated as set forth in example 1, except that a temperature of 220° C. was used.

Two laminates were prepared in this manner.

These laminates had an average peel strength of 35 pounds per inch of width.

EXAMPLE 5

The procedures used in examples 3 and 4 to determine shear strength and peel strength were used in this example except a temperature of 275° C. was used under a pressure of 5,000 p.s.i. for 1 minute. In addition, the overlap area measured three-sixteenth inch rather than one-fourth inch in determining shear strength.

Three laminates had an average peel strength of 40 pounds per inch of width.

The average shear strength of three laminates was greater than 3,000 p.s.i.

EXAMPLE 6

In this example the amount of epoxy resin used to react with the polyamide was determined.

The procedure used was the same as that set forth in example 5 for both assemblies except that the iron sheets and polyamide film were weighed prior to assembly.

The laminates were prepared in substantially the same manner as set forth in example 1 except that the temperature was 250° C.

Excess epoxy resin was wiped off the resulting two laminates which were then weighed.

From the weights, it was determined that the average amount of epoxy resin used to react with the polyamide was 4.5 mg. p.s.i. of polyamide.

EXAMPLE 7

In this example, the aging properties of the instant amorphous polyamide adhesive were compared to the aging properties of a semicrystalline polyamide.

The amorphous polyamide used was the same as that disclosed in example 1. The semicrystalline polyamide was a translucent polyamide made from 11-amino-undecanoic acid having a melting point of 178° C. ("Rilsan–Polyamide 11").

Each polyamide was used in film form having a thickness of 0.006–0.010 inch.

The epoxy resin used was the same as that disclosed in example 3.

In this example, the peel strength of the bond formed by the reaction product of each polyamide film and the epoxy resin with black iron sheet was determined at certain intervals.

The sandwich formed in this example was the same as that set forth in example 2 except that a coating of the epoxy resin was applied to the adhesive area of each adherend and a polyamide film placed therebetween.

Each sandwich was laminated and its peel strength determined as set forth in example 2.

A number of laminates were formed.

The initial peel strength of some of the laminates was determined and the remaining laminates were immersed in a boiling mixture comprised of 8 percent ethyl alcohol and 92 percent water. After immersion for certain periods of time, a number of the laminates were removed and their peel strengths determined.

The results are given in the table below, The data in the table clearly shows that laminates formed with the semicrystalline polyamide aged much more rapidly than those prepared with the amorphous polyamide.

EXAMPLE 8

In this example, the amorphous polyamide disclosed in example 1 and the epoxy resin (Epon 828) disclosed in example 3 were used to form the side seam cement for beer cans. The polyamide was used in the form of a film which had a thickness of 0.006 inch and a width of 0.25 inch.

Steel black plate, 0.008 inch thick, was used to make the cans. Rectangular blanks were cut which were sufficient in size to form conventional 12-ounce beer cans. Each blank was made into a tube wherein the overlap of the side edges measured 0.26 inch. The epoxy resin was coated on the lap area of each adhering edge and the polyamide film was placed lengthwise between the epoxy coated overlapping edges of the tube. The lap area of the overlapping edges was then placed under a pressure of approximately 4,000 p.s.i. and heated to 275° C. After 1½ minutes at 275° C., the heat was removed but the pressure was maintained 10–15 seconds during cooling. The resulting side seam was 5 inches long, the overlap was 0.26 inch and the adhesive thickness was 0.003 inch.

Twenty tubes were made in this manner. The ends of each tube were flanged with a hand flanger. A can end was seamed to one end of each tube, and the resulting can body was sprayed internally and externally with vinyl lacquer and placed in an oven at 130° C. for 16 minutes. The cans were filled with chilled (4° C.,) beer (2.4 volumes $CO_2$ nominally, headspace seven-sixteenth inch). The other can end was then double seamed on. The cans were placed in a retort containing water at 160° F. and pasteurized at this temperature for 75 minutes. They were then cooled over a 15-minute period to 90° F. before being removed from the retort. All the cans were pasteurized successfully and none displayed any leakage. Seventeen of the cans were stored in a hot room maintained at 100° F., and three of the cans were kept at room temperature.

The pressure in the cans was tested with a standard dial pressure gauge provided with a spike for piercing the cans. After one day at room temperature, the pressure in one can measured 2.4 volumes of $CO_2$ showing no pressure loss. After two weeks in the hot room, three cans displayed leakage but his was not due to the side seams which were satisfactory. During a period of eight months in the hot room, a few cans were removed at certain intervals. None displayed leakage and the side seam was satisfactory. At the end of eight months three cans remained in the hot room. They display no leakage and are in satisfactory condition.

What is claimed is:

1. A composition useful for bonding structures consisting essentially of the cured reaction product formed by heating an epoxy resin having an epoxide equivalent of 140–375 and an average molecular weight of 290–750 with an amorphous polyamide formed from terephthalic acid and an isomeric mixture of 2,2,4- and 2,4,4,-trimethylhexamethylenediamine.

2. A laminate comprised of adherends bonded together with the adhesive composition of claim 1.

3. A laminate according to claim 2 wherein the adherends are metal.

4. A tubular metal can wherein the side seam is cemented with the adhesive composition of claim 1.

| Immersion time (days) | Laminates formed with semi-crystalline polyamide | | Laminates formed with amorphous polyamide | | | |
|---|---|---|---|---|---|---|
| | Number tested | Average peel strength, lbs./in. | Number tested | Average peel strength, lbs./in. | Number tested | Average peel strength, lbs./in. |
| 0 | 2 | 31 | 2 | 35 | 2 | 30 |
| 3 | 2 | 25 | 2 | 42 | 2 | 28 |
| 7 | | | | | | |
| 14 | 2 | 19 | 2 | 35 | 2 | 25 |
| 28 | 2 | 14 | | | 2 | 22 |